United States Patent
Mattos (10) Patent No.: US 9,236,903 B2
(45) Date of Patent: Jan. 12, 2016

(54) MULTI-PATH DETECTION

(75) Inventor: Philip Mattos, Ruardean Woodside (GB)

(73) Assignee: STMICROELECTRONICS (RESEARCH & DEVELOPMENT) LIMITED, Marlow Bucks (GB)

(*) Notice: Subject to any disclaimer, the term of this patent is extended or adjusted under 35 U.S.C. 154(b) by 34 days.

(21) Appl. No.: 14/234,924

(22) PCT Filed: Jul. 12, 2012

(86) PCT No.: PCT/EP2012/063733
§ 371 (c)(1),
(2), (4) Date: Mar. 6, 2014

(87) PCT Pub. No.: WO2013/014001
PCT Pub. Date: Jan. 31, 2013

(65) Prior Publication Data
US 2014/0241402 A1    Aug. 28, 2014

(30) Foreign Application Priority Data
Jul. 26, 2011  (GB) .................................. 1112810.5

(51) Int. Cl.
*H04B 1/709*  (2011.01)
*H04B 1/711*  (2011.01)
*H04B 1/7103*  (2011.01)

(52) U.S. Cl.
CPC .............. *H04B 1/711* (2013.01); *H04B 1/7103* (2013.01); *H04B 2201/70715* (2013.01); *H04B 2201/709718* (2013.01)

(58) Field of Classification Search
CPC ................. H04B 1/7085; H04B 1/707; H04B 2001/70706; H04B 7/216; H04B 1/709; H04B 1/7075; H04B 1/711; H04B 1/7103; G01S 19/22; G01S 19/29; G01S 19/50; G01S 5/0215; G01S 19/11; G01C 21/26
USPC .................... 375/130, 140, 147–150, 343; 340/539.13; 342/357.22
See application file for complete search history.

(56) References Cited

U.S. PATENT DOCUMENTS

| | | | |
|---|---|---|---|
| 5,781,152 A | 7/1998 | Renard et al. | |
| 8,908,744 B1* | 12/2014 | Qi | 375/149 |
| 2002/0186794 A1 | 12/2002 | Oesch et al. | |
| 2007/0211793 A1* | 9/2007 | Han | 375/150 |
| 2008/0205493 A1* | 8/2008 | Kohli et al. | 375/150 |
| 2009/0168925 A1 | 7/2009 | Shirai | |

FOREIGN PATENT DOCUMENTS

| | | |
|---|---|---|
| EP | 1143631 | 10/2001 |
| JP | 2008107160 | 5/2008 |
| WO | 2010098465 | 9/2010 |
| WO | 2010111405 | 9/2010 |

* cited by examiner

*Primary Examiner* — Tesfaldet Bocure
(74) *Attorney, Agent, or Firm* — Allen, Dyer, Doppelt, Milbrath & Gilchrist, P.A.

(57) ABSTRACT

A method for detecting multi-path interference in a spread-spectrum signal. A variation of a first signal and a variation of a second signal is compared. The variation of the first signal corresponds to a correlation of the spread-spectrum signal and a spreading code having a first offset. The variation of the second signal corresponds to a correlation of the spread-spectrum signal and the spreading code having a second offset. Multi-path interference is detected in dependence on the comparison.

21 Claims, 4 Drawing Sheets

MULTI-PATH DETECTION

FIELD OF THE INVENTION

This invention relates to spread-spectrum signals and particularly but not exclusively to the detection of multi-path interference in such signals.

BACKGROUND OF THE INVENTION

In global navigation satellite systems (GNSS), data received from satellites is used to triangulate a position of a GNSS receiver. The GNSS receiver uses ephemeris and timing data to calculate a position of a number of satellites at a given time and determines its own position relative to the satellites.

In these systems, a GNSS receiver may receive a line of sight LoS signal directly from the satellite as well as multi-path MP signals. The multi-path signals are signals originating at a satellite and received at the receiver via reflection by the surrounding environment.

These multi-path signals may form constructive and destructive interference with corresponding LoS signals. The resultant signal processed by the GNSS receiver may be distorted by the multi-path components and may affect an accuracy of a position calculated by the GNSS receiver.

According to a first aspect there is provided a method for detecting multi-path interference in a spread-spectrum signal comprising: comparing a variation of a first signal corresponding to a correlation of the spread-spectrum signal and a spreading code having a first offset and a variation of a second signal corresponding to a correlation of the spread-spectrum signal and the spreading code having a second offset; and detecting multi-path interference in dependence on the comparison.

The first and second signals may be offset with respect to a phase of the spread-spectrum signal. The phase of the spread-spectrum signal may be acquired by a receiver.

The first signal may be a measurement of the correlation between the spread-spectrum signal and the spreading code having the first offset and the second signal may be a measurement of the correlation between the spread-spectrum signal and the spreading code having the second offset.

The first and second offsets may be respective negative and positive offsets with respect to the phase of the spread-spectrum signal. The first and second signals may be generated by a tracking loop of a spread-spectrum receiver.

The step of comparing may comprise determining a relationship between the first and second signal. The relationship may be a relationship of a power variation of the first and the second signal. The step of detecting multi-path interference may comprise determining whether the determined relationship falls within a range.

The range may correspond to an allowed power variation of the second signal. The power variation of the second signal may correspond to a level of multi-path interference in the spread-spectrum signal. The relationship may correspond to a ratio of the power variation of the first signal to the power variation of the second signal.

The method may further comprise: receiving a spread-spectrum signal; acquiring the phase of the spread-spectrum signal; and tracking the spread-spectrum signal. Tracking the spread-spectrum signal may further comprise adjusting the phase of the spread-spectrum signal.

According to a second aspect, there is provided an apparatus for detecting multi-path interference in a spread-spectrum signal comprising a processing unit configured to compare a variation of a first signal corresponding to a correlation of the spread-spectrum signal and a spreading code having a first offset and a variation of a second signal corresponding to a correlation of the spread-spectrum signal and the spreading code having a second offset, and detect multi-path interference in dependence on the comparison.

The first and second signals may be offset with respect to a phase of the spread-spectrum signal. The processing unit may be further configured to acquire the phase of the spread-spectrum signal.

The first signal may be a measurement of the correlation between the spread-spectrum signal and the spreading code having the first offset and the second signal may be a measurement of the correlation between the spread-spectrum signal and the spreading code having the second offset.

The first and second offsets may be respective a negative and positive offsets with respect to the phase of the spread-spectrum signal. The first and second signals may be generated by a tracking loop of a spread-spectrum receiver.

The processing unit may be further configured to determine a relationship between the first and second signal. The relationship may be a relationship of a power variation of the first and second signal.

The processing unit may be further configured to determine whether the determined relationship is within a range. The range may correspond to an allowed power variation of the second signal. The power variation of the second signal may correspond to a level of multi-path interference in the spread-spectrum signal. The relationship may correspond to a ratio of the power variation in the first signal to the power variation in the second signal.

According to a third aspect, there is provided a spread-spectrum receiver comprising: receiver circuitry configured to receive a spread-spectrum signal; the receiver being configured to receive a plurality of channels and having a processing unit configured to for each channel, acquire a phase of the spread-spectrum signal and track the spread-spectrum signal; the processing unit being further configured to compare a variation of a first signal corresponding to a correlation of the spread-spectrum signal and a spreading code having a first offset and a variation of a second signal corresponding to a correlation of the spread-spectrum signal and the spreading code having a second offset, and a detect multi-path interference in dependence on the comparison.

According to a fourth aspect, there is provided a mobile terminal comprising the spread-spectrum receiver according to the third aspect.

According to a fifth aspect, there is provided a satellite navigation positioning unit comprising the spread-spectrum receiver according to the third aspect.

BRIEF DESCRIPTION OF THE DRAWINGS

Embodiments will now be described with reference to the following drawings in which.

DETAILED DESCRIPTION

Embodiments may detect the presence of multi-path interference in a spread-spectrum signal. In some embodiments, an early correlation signal and a late correlation signal are used to detect the presence of multi-path interference. The early and late correlation signals may be generated during the tracking of a spread-spectrum signal. A variation of the early correlation signal and a variation of the late correlation signal may be compared. In some embodiments the variation of the early correlation signal may be consistent irrespective of the presence of multi-path interference while a late correlation signal may vary in the presence of multi-path interference.

In some embodiments a comparison is made between the variation shown by the early correlation signal and the variation shown by the late correlation signals and the presence of multi-path interference is identified based on the comparison. In some embodiments the variation of the power of the signal over a period of time is taken. Some embodiments may provide an indication of whether multi-path interference is present and/or the level of interference present.

GNSS systems typically make use of spread-spectrum signals. A spread-spectrum signal is one in which an information signal generated in a particular bandwidth is spread in the frequency domain. The spread-spectrum signal may therefore have a wider bandwidth than the original information signal. In some GNSS systems data from the satellite such as ephemeris and timing data may be sent as spread-spectrum signals. These may be systems such as the global positioning system GPS and the future Galileo which make use of CDMA (code division multiple access). Other GNSS systems may make use of spread-spectrum signals for purposes alternative and/or in addition to the transmission of satellite data. For example although GLONASS does not use traditional CDMA, it may make use of spread-spectrum signals.

A signal may be spread using a spreading code. In some embodiments, the spreading code may be a pseudo-random noise code that has a low correlation with other pseudo-random noise codes in a same set. In order to recover information from a signal, the spread-spectrum signal may be despread by correlating the received signal with a corresponding spreading code generated at the receiver. In some embodiments phase information may be recovered from the spread-spectrum signal. The phase information may be used for example to determine a transmission time from a satellite to a receiver. Alternatively or additionally the signal may be despread in order to recover data encoded in the spread-spectrum signal.

In order to despread or recover information from a signal, a spreading code generated at the receiver may be synchronized to the received signal. For example, in addition to acquiring a carrier frequency of the received signal, a phase and code rate of the receiver generated spreading code may be synchronized to a phase and code rate of the received signal.

Figure 1:
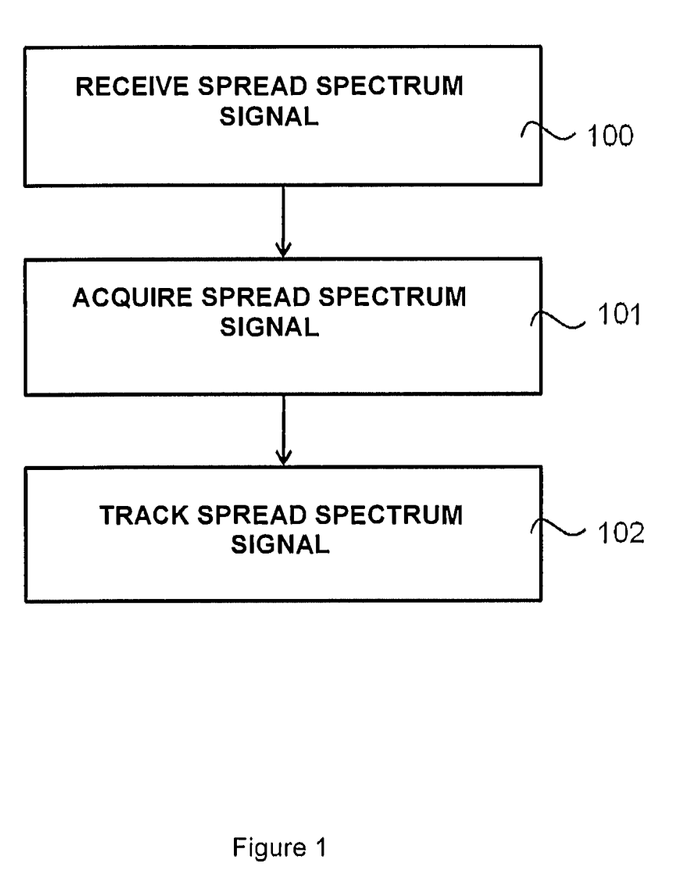
FIG. 1 shows a method of the acquisition and tracking of a spread-spectrum signal.

FIG. 1 shows an exemplary method of recovering information from a spread-spectrum signal. In some embodiments, the spread-spectrum signal may be despread in order to recover data contained within the signal. In these or alternative embodiments, phase information may be recovered from the signal. For example a phase offset of the received signal may be determined with respect to a transmitted phase of the signal from a satellite. The phase offset may be dependent on a receiver distance from the satellite and in some embodiments may be used to determine a distance of the receiver from the satellite.

It will be appreciated that in some embodiments only the phase information may be of interest and data may not be recovered from the signal. In some embodiments data may be recovered only periodically from the signal.

In FIG. 1, the spread-spectrum signal may be received at a receiver. In some embodiments the receiver may be a GPS and/or Galileo receiver. It will be appreciated that this is by way of example only and the receiver may be any device capable of receiving a spread-spectrum signal.

At step 100 in FIG. 1, a spread-spectrum signal is received at the receiver. It will be appreciated that the signal may be transmitted in any suitable form and some demodulation or down converting steps may be carried out before and/or during step 100.

The receiver may determine a phase and code rate of the received signal. The receiver may also acquire a frequency of a carrier of the received signal. Differences between the phase and code rate of the signal transmitted from the satellite and the signal received at the receiver may be due to a transmission time of the signal as well as factors such as the Doppler effect.

In order to recover information from the signal, the receiver may synchronize a receiver generated spreading code to the received spread-spectrum signal. Because the phase and code rate of the received signal may change with motion of the receiver and the satellite, the received signal may also be tracked after the initial synchronization.

After receiving the signal, the method of FIG. 1 synchronizes to the signal in the acquisition stage 101 and tracks the signal during tracking stage 102. It will be appreciated that the sequential acquisition and tracking stages may be by way of example only and in some embodiments the method may periodically alternate between the acquisition and tracking stages.

During the acquisition stage 101 the synchronization may be carried out. It will be appreciated that in some embodiments, the spreading code may be used to identify a source of the received signal, for example a satellite from which the signal is received. In some embodiments this identification of the signal may be carried out during the acquisition stage 101. In some embodiments a carrier of the received signal may be acquired simultaneously to a phase and code rate of the signal. In some embodiments, the acquisition stage 101 may carry out a coarse acquisition of the received signal.

Once the signal has been acquired, the method may progress to step 102 where the signal may be tracked. For example a phase of the received signal may change with a motion of the receiver and the signal may be tracked to follow the phase. During the acquisition 101 and tracking phases 102, a phase of the receiver generated spreading code may be determined to match a phase of the received signal. The received signal may be tracked through use of early correlation signal and late correlation signals.

In some embodiments in the tracking stage 102, an early correlation signal may be generated by correlating the received signal with an early spreading code. Similarly, a late correlation signal may be generated by correlating the received signal with a delayed or late spreading code. The early spreading code may correspond to a spreading code having a phase offset to the phase of the received signal. This may be a negative phase offset.

The late spreading code may correspond to a spreading code having a phase offset to the received signal. This may be a positive phase offset.

In some embodiments, the early and late spreading codes may correspond to the sequence of the spreading code used to spread the signal but have a phase offset corresponding to a transmission time and a code rate affected by the Doppler effect.

Information provided by the early and late correlation signals may be used to track the spreading code. In one example, a power of the early and late correlation signals may provide an indication of an accuracy of the acquired phase of the spread-spectrum signal. For example the phase offsets may be chosen such that the power variation of the early and late correlation signals is equal when the acquired phase is accurate.

Figure 2:
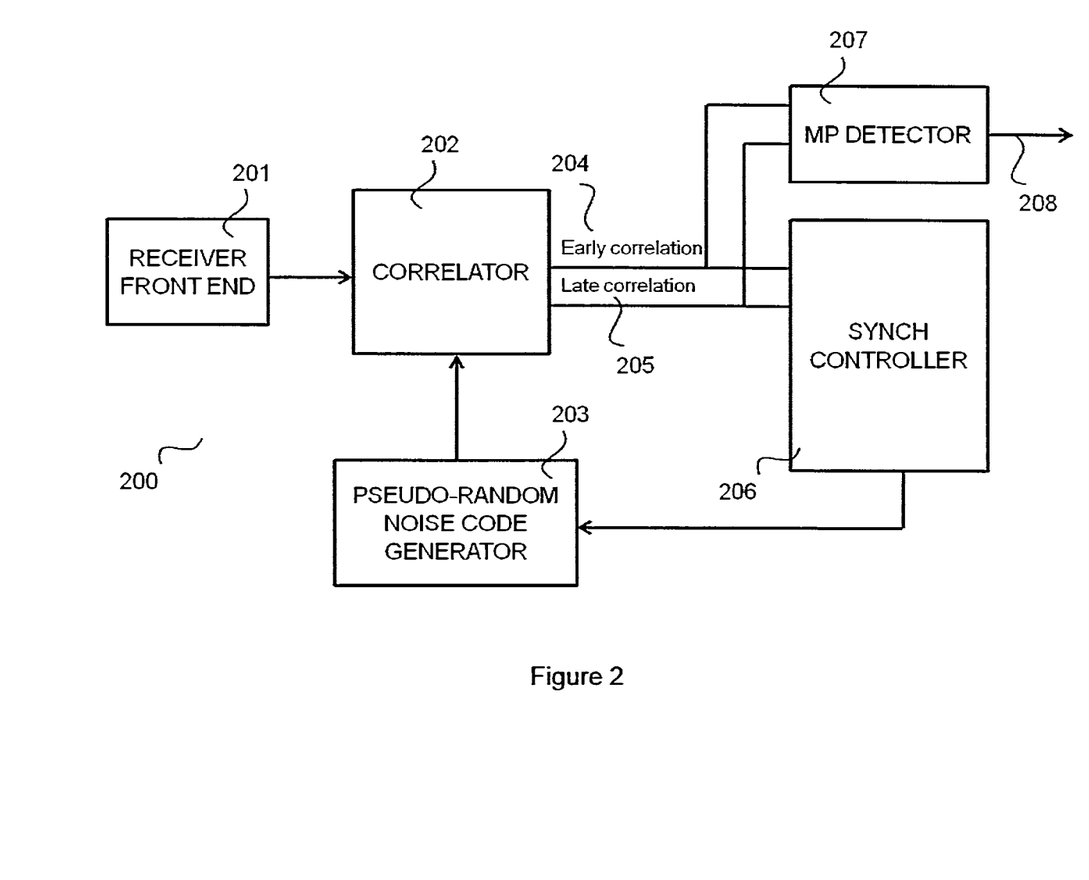
FIG. 2 depicts tracking circuitry of a spread-spectrum signal receiver.

FIG. 2 shows an embodiment of a spread-spectrum receiver.

FIG. 2 comprises a receiver front end 201 which may provide an output to a correlator 202. The correlator 202 may provide an early correlation output 204 and a late correlation output 205 to a synchronization controller 206. The correlator 202 may receive an input from a pseudo-random noise code generator 203 which may receive a control signal from the synchronization controller 206. The early correlation output 204 and late correlation output 205 may also be provided to a multi-path detector 207 which provides a signal 208 indicating the presence of multi-path interference.

It will be appreciated that, while in the embodiment of FIG. 2 the spreading code is a pseudo-random noise code and is generated by the pseudo-random noise code generator 203, other suitable spreading codes may be used and the pseudo-random noise code generator 203 may generate any applicable spreading code.

It will be appreciated that in some embodiments, the receiver 200 may receive signals corresponding to a number of channels. The receiver may carry out correlation, spreading code generation and multi-path detection for each channel. It will be appreciated that in some embodiments multipath detection may be carried out for all the channels or may be carried out for only some of the channels.

The receiver front end 201 may receive a spread-spectrum signal. In some embodiments, the spread-spectrum signal may be received for example from a global navigation system satellite. The receiver front end 201 may provide initial processing on the received signal for example, down converting and initial filtering. In some embodiments, the receiver front end 201 may pass a received signal to the correlator 202.

It will be appreciated that in some embodiments the correlator 202, multi-path detector 207, pseudo-random noise code generator 203 and synchronization controller 206 may be implemented by a processor.

FIG. 2 will now be described with reference to the tracking phase 102. A phase and code rate of the received signal may be determined at the receiver. In some embodiment an initial coarse acquisition of a phase and code rate of the spread-spectrum signal may have been carried out during the acquisition stage 101. In some embodiments, the acquired phase and code rate of the received signal may be provided to a positioning unit and used to determine a position of the receiver. Additionally or alternatively the determined phase and code rate of the received signal may be used to generate a spreading code for correlation with the received signal in order to recover data in the signal. In some embodiments, phase and code rate information may be used to determine position while data may be recovered from the signal at periodic intervals.

It will be appreciated that a phase and code rate of the received signal may change during motion of the receiver. The phase and code rate of the received signal may be tracked during the tracking phase 102 and the phase and code rate may be updated with the motion of a receiver.

In order to track the received signal, the receiver may correlate the received signal with tracking signals. In some embodiments this may be used to determine the accuracy of the phase of the received signal determined at the receiver and the tracked signals may be adjusted until it is determined that the phase is accurate.

In some embodiments the tracking signals may be the early correlation signal and the late correlation signal. The early and late correlation signals may have a respective early and late phase offset to the determined phase of the received signal. In some embodiments a variation of the power of the early and the late correlation signals may be used to determine whether the determined phase is accurate.

In FIG. 2, the synchronization controller 206 may provide control information to the pseudo-random noise code generator 203. The control information may indicate a phase of a spreading code to be generated. In some embodiments the control information may be a determined phase of the received signal and/or respective phases for the early and late correlation signals. The pseudo-random noise code generator 203 may generate tracking signals corresponding to the control information. In some embodiments, the tracking signals may correspond to an early spreading code and a late spreading code.

The early and late spreading codes may be passed to the correlator 202. The correlation 202 may correlate the early spreading code with the received signal to generate an early correlation signal. The correlator 202 may also correlate the late spreading code with the received signal to generate a late correlation signal. The early and late correlation signals may be passed onto the synchronization controller 206 which may determine an accuracy of a determined phase of the received signal and may adjust the determined phase. Information regarding the determined phase of the received signal may be passed to the pseudo-random noise code generator.

For example, the synchronization controller 202 may expect the early and late correlation signals to be of equal power if the phase offsets are symmetrical around the phase of the received signal. In this example, the determined phase of the received signal may be adjusted such that the early and late correlation signals are equal.

In some embodiments the phase offset of the early and late spreading codes from the determined phase of the received signal may be determined based on the strength of the received signal. For example the early spreading code and late spreading code may have half a chip offsets to the determined phase of the received signal. It will be appreciated that the half a chip offset is by way of example only and greater or smaller phase differences may be used for the early and late correlations.

The early and late correlation signals may be used to determine the presence of multi-path interference. In the embodiment of FIG. 2, the early correlation signal 204 and the late correlation signal 205 may be input to the multi-path detector 207. The multi-path detector 207 may be provided to detect any multi-path interference on the spread-spectrum signal. An indication of multi-path interference may be output on signal 208.

Although the multi-path detector 207 is provided as part of a GNSS spread-spectrum receiver in some embodiments, it will be appreciated that a multi-path detector according to embodiments may be provided with other spread-spectrum receivers. It will also be appreciated that while the multi-path detector has been depicted as a separate block, the multi-path detector may be integrated into receiver circuitry. In some embodiments the multi-path detector may be implemented by a processor of a receiver.

The detection of multi-path interference according to some embodiments will be discussed in relation to FIGS. 3a and 3b.

Figure 3A:
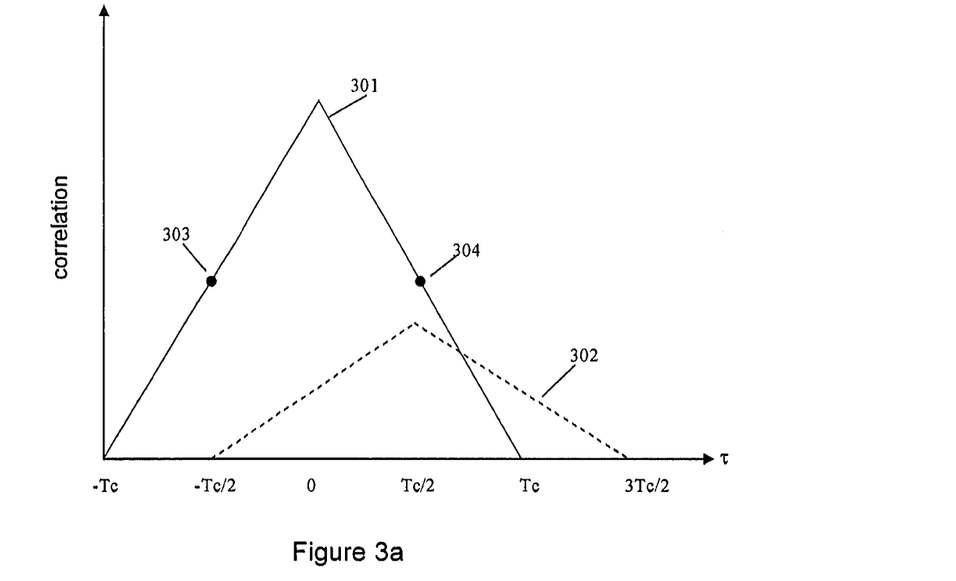
FIG. 3a shows the correlation function of a line of sight spread-spectrum signal and a multi-path spread-spectrum signal.

FIG. 3a shows a line of sight LoS 301 and multi-path 302 correlation function. FIG. 3b shows a correlation function of a combined line of sight LoS signal and multi-path signal. The correlation function may correspond to the power of a correlation between the spread-spectrum signal and spreading codes having varying offsets.

Figure 3B:
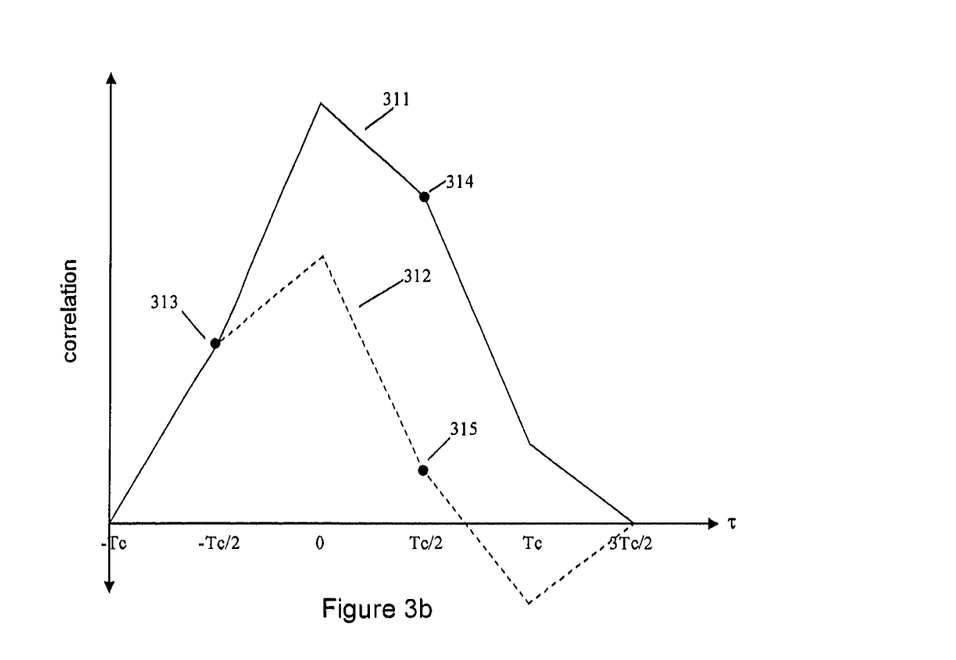
FIG. 3b shows the correlation function of a spread-spectrum signal having both line of sight and multi-path components.

FIG. 3a and FIG. 3b plot the correlation function against $\tau$, where $\tau$ is a phase difference between a phase of the received spread-spectrum signal and the phase of a spreading code correlated with the received signal in chips Tc.

In FIG. 3a, the correlation function of a line of sight LoS spread-spectrum signal is shown by line 301. This may correspond to an ideal case where the receiver receives a signal with no interference.

When $\tau=0$, in other words when the spreading code correlated with the received signal is in-phase with the received signal, the correlation function 301 is at a maximum. The correlation function 301 tapers symmetrically to 0 as the $\tau$ is increased and decreased. The correlation between the received signal and the receiver generated spreading code may decrease as the phase difference between the receiver generated spreading code and the received signal is increased.

In the example of FIG. 3a, an early point 303 and a late point 304 are shown. In this example the early point corresponds to the correlation between the spread-spectrum signal and a spreading code with a negative half a chip phase offset to the phase of the received signal. Similarly, the late correlation point may correspond in this example to the correlation between the spread-spectrum signal and a spreading code with a positive half a chip phase offset to the phase of the spread-spectrum signal. It will be appreciated that half a chip is by way of example only and the early and late point may be chosen based on the characteristics of the received signal.

The early and late points may correspond in some embodiments to the early correlation signal 204 and the late correlation signal 205.

It can be seen from FIG. 3a that in the presence of no multi-path interference, the amplitude of the early and late points, being symmetrical around $\tau=0$, may have similar values in some embodiments.

FIG. 3a shows the correlation function of a multi-path signal 302. A signal may be subject to reflection in the surrounding environment of a receiver and may be received along with a line of sight signal. The multi-path signal may be attenuated and delayed due to the longer path. In the example of FIG. 3a, the multi-path correlation function 302 is at a maximum at $\tau=Tc/2$. This may correspond to a half a chip delay in the reception of the multi-path signal 302 due to the multi-path propagation. The correlation function of the multi-path signal 302 may be delayed with respect to the line of sight correlation function 301. The multi-path signals may therefore interfere with line of sight signals and cause constructive and destructive interference.

FIG. 3b shows the correlation function of a received signal with multi-path and line of sight components. FIG. 3b shows a correlation function 311 with constructive multi-path interference and a correlation function 312 with destructive multi-path interference. FIG. 3b also shows early point 313 and late points 314 and 315. These may be similarly chosen as the early and late points of FIG. 3a.

As can be seen from FIG. 3b in embodiments, the multi-path signal may have negligible influence on early point 313 because multi-path signals are delayed with respect to the line of sight signal. The multi-path interference may therefore have little influence on the early correlation signal 204 input to multi-path detector 207.

The late point and late correlation signal however may be influenced by the multi-path interference. FIG. 3b shows point 315 corresponding to destructive multi-path interference and point 314 corresponding to constructive multi-path interference. It can be seen that with constructive interference, the late point 314 has a greater amplitude than the ideal late point 304 and with destructive interference, the late point 315 has a lower amplitude than the ideal late point 304. In some embodiments a mobile receiver may experience both constructive and destructive interference as the receiver moves. The late point may oscillate between the point 314 and 315 as the receiver experiences constructive and destructive interference respectively.

In some embodiments the multi-path detector 207 may monitor a variation of the late point 314, 315 of the correlation function. The late point 314, 315 may be expected to vary when subject to constructive and destructive interference. The variation of the late point may provide an indication of multi-path interference in some embodiments. The multi-path detector 207 may also monitor the variation of the early point 313. As discussed, in some embodiments the early point 313 may be expected to have a low variation. In some embodiments, the multi-path detector 207 may compare the variation of the power of an early correlation signal and late correlation signal and determine if multi-path interference is present based on this comparison.

It will be appreciated that the amplitude of both the early and late correlation points can be simultaneously affected by environmental factors effecting their attenuation of the received signal. For example the amplitude of both the early and late correlation signals may be attenuated by a receiver passing into a sheltered area. The early and late correlation points may experience similar variation due to this. The late correlation point may experience further variation due to multi-path components.

The multi-path detector 207 may therefore detect the presence of multi-path interference by comparing a variation of the early correlation signal to a variation of the late correlation signal. While the variation of the early correlation signal should not deviate greatly from the ideal case where only a line of sight signal is received, the variation of the late correlation signal is subject to both constructive and destructive interference and will vary greatly. In the ideal case where only a line of sight signal is received, the variation of the early correlation signal and variation of the late correlation should be similar.

In some embodiments the variation of the early and late points may be taken over a period of time. In some embodiments the period of time over which the variation is taken may be dependent on a correlation interval of the receiver. Measurements of the early and late correlation signals may be taken at intervals for the tracking loop. These measurements may be taken by the synchronization controller 206 or other circuitry. The intervals may be dependent on a required accuracy and response time of the receiver. A longer correlation interval may increase accuracy but worsen response time and the interval may be chosen according to this criteria. In some embodiments the time over which the variation of the early and late points is taken may correspond to these intervals. For example, the measurement of the correlation signal may be available to the multi-path detector 207 at these times from the tracking loop. In other embodiments the multi-path detector may set other time intervals.

Figure 4:
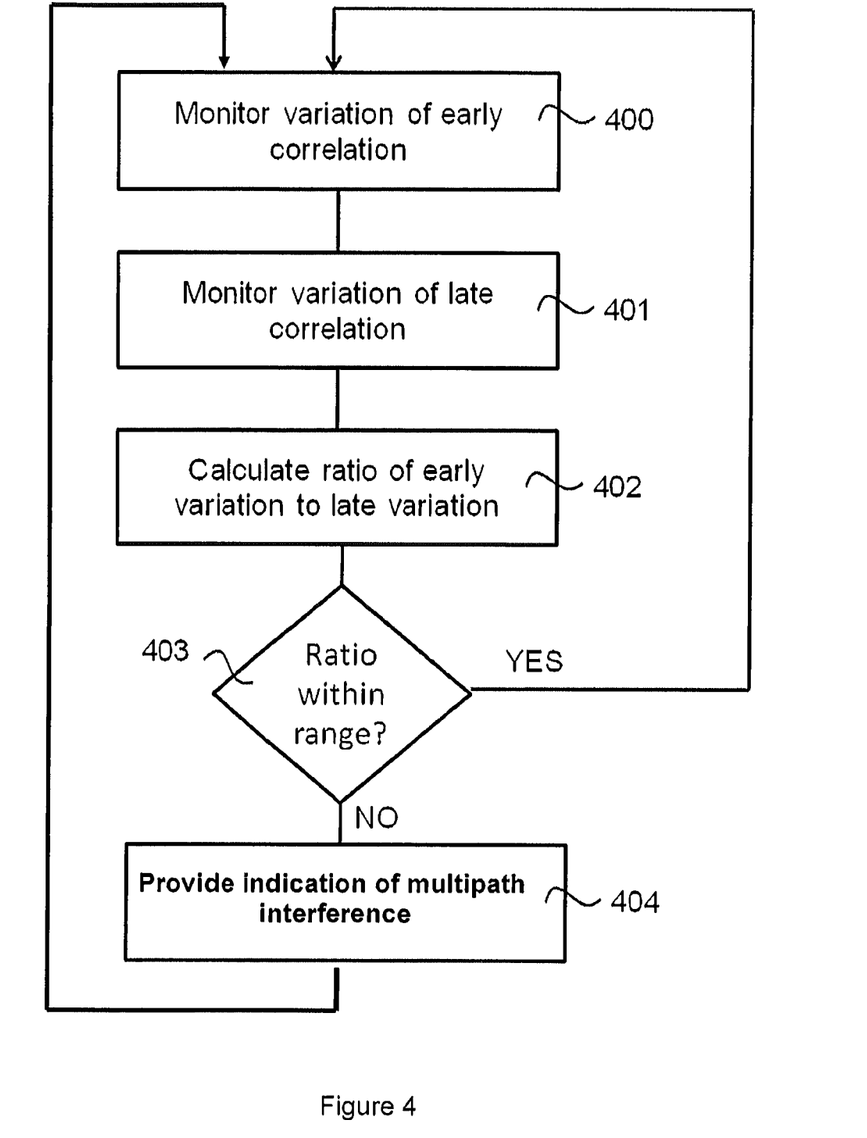
FIG. 4 shows an example of a method to detect multi-path interference in a spread-spectrum signal.

FIG. 4 shows an example of a method carried out by the multi-path detector 207 of FIG. 2. It will be appreciated that the multi-path detector 207 may be implemented in hardware or software. In some embodiments, the multi-path detector 207 may be implemented by a processor and may be implemented by the same or different circuitry to that implementing the correlator and synchronization controller.

The multi-path detector 207 of FIG. 4 may receive the early correlation signal 204 and the late correlation signal 205. It will be appreciated that in some embodiments the early and late correlation signals may be provided in the form of periodic measurements from the correlator. At step 400, the multi-path detector 207 monitors the variation of the early correlation signal 204. At step 401 the multi-path detector monitors the variation of the late correlation signal 205. It will be appreciated that steps 400 and 401 may be carried out simultaneously.

In some embodiments, the multi-path detector 207 may monitor the variation of the power of the early and late correlation signals. In some embodiments, the multi-path detector 207 may detect a lowest power and a peak power of each signal and calculate a power variation of that signal based on the difference between the lowest and peak power. The lowest and peak power may be calculated over a time period.

When the variation of power of the early and late correlation signals has been determined, the method proceeds to step 402, where a relationship between the variation of the early signal and the variation of the late signal is determined. In some embodiments this may be done by calculating a ratio of a variation of the power of the early signal to a variation of a power of the late signal. In other embodiments, a difference between the early power variation and the late power variation may be taken.

At step 403, a determination may be made whether the relationship indicates the presence of multi-path interference. For example a determination may be made as to whether the relationship is within an acceptable range. In some embodiments the relationship may provide an indication of not only the presence of multi-path interference but the strength of the multi-path interference. For example in an ideal case where only a line of sight signal is received, the relationship may have an expected value. Deviations from this expected value may indicate the presence of multi-path interference.

For example, where a ratio is taken, the ratio of the power variation of the early signal to the power variation of the late signal may be expected to be 1. Deviations from this may indicate multi-path interference. In some embodiments a level of multi-path interference may correspond to a size of a variation of the ratio from 1. Similarly where a difference is taken between the power variation of the early signal and the power variation of the late signal, the expected difference with no multi-path interference may be close to 0. Variations from this may indicate multi-path interference.

In some embodiments an acceptable range may be chosen such that a certain amount of multi-path interference is acceptable and only interference exceeding a threshold is indicated.

If it is determined that the relationship is within the range, the method may return to step 400 where the multi-path detector continues to track the early and late correlation signals to detect the multi-path interference. If the ratio falls without the acceptable range, the method may proceed to step 404 where a multi-path interference presence signal is sent out. The signal may be sent out on signal 208. The method may then return to step 400 where multi-path interference is continued to be monitored.

It will be appreciated that this is by way of example only and additional or other indicators of interference may be output. Alternatively the relationship of the variation may be output and a level of multi-path interference may be calculated by other circuitry or processing. For example the multi-path detector 207 may set a flag or a signal may be output to indicate that any interference is within an acceptable range.

It will be appreciated that the indication of multi-path interference from the multi-path detector 207 may be used in any suitable manner. For example the indication may be used to address multi-path interference, generate a weighting value for a satellite and/or be used to accumulate information about satellites and areas.

For example, in one embodiment, the multi-path interference signal 208 may be sent to a positioning unit that calculates the position of the receiver based on measurements provided by various channels of the receiver. The measurements may correspond to a transmission time of the signals. Each channel may correspond to a signal received from a particular satellite. The multi-path indicator 208 may therefore provide an indication from each channel as to the amount of multi-path interference experienced by signals received from that satellite. In some embodiments the mathematical positioning unit may weight the importance of measurements received from each satellite in response to the amount of multi-path interference experienced by the satellite. For example, measurement data from line of sight signals may be weighted to be relied upon more than measurements from signals with multi-path interference. In some embodiments, the positioning unit may disregard measurements from satellites with multi-path interference.

It will be appreciated that this is by way of example and the multi-path indicator may be used to provide other forms of multi-path processing.

It will be appreciated that while embodiments are applicable to systems using spread-spectrum signals and the despreading and/or tracking in those systems. For example in GPS and Galileo, embodiments of the invention may be implemented in the tracking of spread-spectrum signals received from the satellite.

It will also be appreciated that while one early point and late correlation is used in embodiments, embodiments may be implemented in systems that have more than one early correlation signals and late correlation signal. In these systems, in some embodiments the multi-path detector may monitor one early correlation signal and one late correlation signal. In other embodiments, the multi-path detector may track more than one early correlation signal and more than one late correlation signal and calculate respective ratios.

The invention claimed is:

1. A method for detecting multi-path interference in a spread-spectrum signal comprising:
    comparing a power variation of a first signal corresponding to a correlation of the spread-spectrum signal and a spreading code having a first offset, and a power variation of a second signal corresponding to a correlation of the spread-spectrum signal and the spreading code having a second offset by calculating a ratio of power variation between the first and second signals; and
    detecting multi-path interference based upon the comparing by determining whether the calculated ratio of power variation is within a threshold range.

2. The method of claim 1 wherein the first and second signals are offset with respect to a phase of the spread spectrum signal.

3. The method of claim 2 wherein the phase of the spread spectrum signal is acquired by a receiver.

4. The method of claim 1 wherein the first signal is a measurement of the correlation between the spread-spectrum signal and the spreading code having the first offset, and the second signal is a measurement of the correlation between the spread-spectrum signal and the spreading code having the second offset.

5. The method of claim 1 wherein the first and second offsets are respective negative and positive offsets with respect to a phase of the spread spectrum signal.

6. The method of claim 1 wherein the first and second signals are generated by a tracking loop of a spread-spectrum receiver.

7. The method of claim 1 wherein the threshold range corresponds to an allowed power variation of the second signal.

8. The method of claim 7 wherein the power variation of the second signal corresponds to a level of multipath interference in the spread spectrum signal.

9. The method of claim 1 further comprising:
receiving the spread spectrum signal;
acquiring a phase of the spread-spectrum signal; and
tracking the spread spectrum signal.

10. The method of claim 9 wherein tracking the spread spectrum signal further comprises adjusting the phase of the spread spectrum signal.

11. An apparatus comprising:
an input for a spread-spectrum signal; and
a processing unit coupled to said input and configured to
compare a power variation of a first signal corresponding to a correlation of the spread-spectrum signal and a spreading code having a first offset, and a power variation of a second signal corresponding to a correlation of the spread-spectrum signal and the spreading code having a second offset,
calculate a ratio of power variation between the first and second signals, and
detect multi-path interference based upon whether the calculated ratio of power variation is within a threshold range.

12. The apparatus of claim 11 wherein the first and second signals are offset with respect to a phase of the spread spectrum signal.

13. The apparatus of claim 12 wherein the processing unit is further configured to acquire the phase of the spread spectrum signal.

14. The apparatus of claim 11 wherein the first signal is a measurement of the correlation between the spread-spectrum signal and the spreading code having the first offset, and the second signal is a measurement of the correlation between the spread-spectrum signal and the spreading code having the second offset.

15. The apparatus of claim 11 wherein the first and second offsets are respective negative and positive offsets with respect to a phase of the spread spectrum signal.

16. The apparatus of claim 11 wherein the first and second signals are generated by a tracking loop of a spread-spectrum receiver.

17. The apparatus of claim 11 wherein the threshold range corresponds to an allowed power variation of the second signal.

18. The apparatus of claim 17 wherein the power variation of the second signal corresponds to a level of multipath interference in the spread spectrum signal.

19. An electronic device comprising:
receiver circuitry configured to receive a spread spectrum signal;
said receiver circuitry being configured to receive a plurality of channels and comprising a processing unit configured to, for each channel, acquire a phase of the spread-spectrum signal and track the spread spectrum signal;
said processing unit being further configured to compare a power variation of a first signal corresponding to a correlation of the spread-spectrum signal and a spreading code having a first offset, and a power variation of a second signal corresponding to a correlation of the spread-spectrum signal and the spreading code having a second offset by calculating a ratio of power variation between the first and second signal, and detect multi-path interference based upon whether the calculated ratio of power variation is within a threshold range.

20. The electronic device of claim 19 wherein said receiver circuitry defines at least part of a mobile terminal.

21. The electronic device of claim 19 wherein said receiver circuitry defines at least part of a satellite navigation device.

* * * * *